(12) United States Patent
Prentice et al.

(10) Patent No.: US 7,064,785 B2
(45) Date of Patent: Jun. 20, 2006

(54) APPARATUS AND METHOD OF CORRECTING FOR DARK CURRENT IN A SOLID STATE IMAGE SENSOR

(75) Inventors: Wayne E. Prentice, Honeoye Falls, NY (US); Stephen M. Coppola, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 634 days.

(21) Appl. No.: 10/068,943

(22) Filed: Feb. 7, 2002

(65) Prior Publication Data

US 2003/0146987 A1  Aug. 7, 2003

(51) Int. Cl.
*H04N 9/64* (2006.01)

(52) U.S. Cl. ............ 348/243; 348/241; 348/246; 348/251; 348/257

(58) Field of Classification Search ............ 348/241, 348/243, 247, 244, 245, 242, 296
See application file for complete search history.

(56) References Cited

U.S. PATENT DOCUMENTS

| | | | |
|---|---|---|---|
| 4,232,331 A | 11/1980 | Motoyama et al. | |
| 4,525,741 A | 6/1985 | Chahal et al. | |
| 4,602,291 A | 7/1986 | Temes | |
| 4,723,170 A | 2/1988 | Jaspers | |
| 5,047,861 A | 9/1991 | Houchin et al. | |
| 5,105,276 A | 4/1992 | Schrock | |
| 5,376,966 A | 12/1994 | Takase | |
| 5,408,335 A * | 4/1995 | Takahashi et al. | 358/443 |
| 5,410,365 A | 4/1995 | Nakamura et al. | |
| 5,477,265 A | 12/1995 | Tani | |
| 5,493,334 A | 2/1996 | Zortea et al. | |
| 5,512,947 A * | 4/1996 | Sawachi et al. | 348/243 |
| 5,519,437 A | 5/1996 | Nelvig | |
| 5,548,332 A | 8/1996 | Topper et al. | |
| 5,548,413 A * | 8/1996 | Watanabe | 358/445 |
| 5,633,679 A | 5/1997 | Hosier et al. | |
| 5,677,527 A | 10/1997 | Cheng | |
| 5,721,427 A * | 2/1998 | White et al. | 250/252.1 |
| 5,736,886 A | 4/1998 | Mangelsdorf et al. | |
| 5,757,440 A | 5/1998 | Mangelsdorf | |
| 5,796,430 A * | 8/1998 | Katoh et al. | 348/246 |
| 5,808,697 A * | 9/1998 | Fujimura et al. | 348/672 |
| 5,940,125 A | 8/1999 | Suganuma | |
| 6,084,634 A | 7/2000 | Inagaki et al. | |
| 6,144,408 A | 11/2000 | MacLean | |
| 6,157,407 A * | 12/2000 | Kobayashi | 348/241 |
| 6,219,445 B1 | 4/2001 | Todoroki | |
| 6,271,880 B1 * | 8/2001 | Kameshima et al. | 348/244 |
| 6,774,942 B1 * | 8/2004 | Salcedo et al. | 348/243 |
| 6,791,607 B1 * | 9/2004 | Bilhan et al. | 348/243 |
| 6,829,007 B1 * | 12/2004 | Bilhan et al. | 348/243 |
| 6,839,452 B1 * | 1/2005 | Yang et al. | 382/103 |
| 2002/0033764 A1 * | 3/2002 | Graen | 341/155 |
| 2002/0134918 A1 * | 9/2002 | Milda | 250/214.1 |
| 2002/0179713 A1 * | 12/2002 | Pettinelli et al. | 235/454 |
| 2003/0002624 A1 * | 1/2003 | Rinaldi et al. | 378/98.8 |
| 2003/0146987 A1 * | 8/2003 | Prentice et al. | 348/243 |

* cited by examiner

*Primary Examiner*—Thai Tran
*Assistant Examiner*—Nelson D. Hernandez
(74) *Attorney, Agent, or Firm*—Peyton C. Watkins

(57) ABSTRACT

Apparatus and method of correcting for dark current in a solid state image sensor, include capturing an image with the image sensor to produce a digital image having pixel values; correcting the pixel values with a dark level correction value; employing a control system to adjust the dark level correction value to drive the number of pixels having values lower than a predetermined value chosen to represent dark scene content to a predetermined range.

13 Claims, 3 Drawing Sheets

APPARATUS AND METHOD OF CORRECTING FOR DARK CURRENT IN A SOLID STATE IMAGE SENSOR

FIELD OF THE INVENTION

The present invention relates to solid state image sensors, and more particularly to methods and apparatus for correcting for dark current in a solid state image sensors.

BACKGROUND OF THE INVENTION

The photo-sites in solid state image sensors generate current in the absence of light due the thermal action of electrons in the devices. This thermally generated current is called dark current, and adds to the photo-current generated by the photo-sites when exposed to light. One approach to reducing dark current is to cool the image sensor, for example using liquid nitrogen. This approach is not considered practical for consumer applications. Accordingly, it is generally necessary to correct digital images by removing the component of the image signal due to dark current. To remove the dark current from the image signal, the level of dark current produced by the sensor must be known. If the dark current is under-estimated, the dark current corrected image will appear to have flare and when it is over-estimated shadows will turn black thereby causing shadow detail to be lost. In either case, after white balancing, it is impossible to maintain a neural gray without hue throughout the gray scale when the dark current is improperly determined. White balancing is an adjustment to the color balance of an image to take into account the color of the illuminant under which the image was acquired.

One technique for determining the dark current is to measure a sample of image sensors in the factory to determine the average dark current produced by the sensors, and to employ this value for correction. This will not provide a satisfactory solution in cases where the dark current is temperature dependent or where it changes over time. Another technique for determining the dark current in an image sensor is to mask some of the photo-sites in the image sensor, sense the signal produced by the masked photo-sites and subtract the sensed signal from the signals produced by the unmasked photo-sites in the image sensor. See for example U.S. Pat. No. 5,105,276 issued Apr. 14, 1992 to Schrock.

One problem encountered with this latter approach is that anomalies caused by the device physics may prevent a light shielded pixel from accurately estimating the dark current. Further, other device properties may change the dark current dependent upon the scene brightness or the length of the exposure. For example, in some CMOS image sensors the nonlinear signal response of the photo-sensor at low signal levels makes it difficult to estimate the dark current signal level from the signals produced by shielded pixels.

It is also known to determine correction values for individual images by using the histograms of the images. In these applications, it is assumed a small predetermined percentage of the pixels are black. The next step is to form a histogram of the pixel values and determine the code value that is associated with the predetermined percentage. For example, suppose it is assumed that 2% of all pixels are black and the image being corrected contains 1 Megapixels. This means that 20 k pixels in the image are assumed black. Next, all of the pixels in the histogram are added up starting from code value 0 to n to find the last bin for which the sum is less than 20 k. The correction offset is then set to n. The Kodak Palm Pix camera uses this method to determine a dark level correction for a still image prior to any dark correction.

This approach is not applicable to correct for dark current in a video stream because it would not be stable over time because the value of the offset is determined by an estimate that includes a range of variability. Furthermore, if previously corrected signals are used to determine the offset, the approach would not converge on a reasonable correction because each new application of correction would add to the last, driving the correction to an extreme. This is important since the design of available image sensors often include a dark level correction that is applied on the image sensor chip before the signal becomes available for the further processing that is required for determining the offset using the histogram method.

There is a need therefore for an improved technique for correcting for dark current in a solid state image sensor that avoids the problems noted above.

SUMMARY OF THE INVENTION

The need is met according to the present invention by providing an apparatus and method of correcting for dark current in a solid state image sensor, that includes capturing an image with the image sensor to produce a digital image having pixel values; correcting the pixel values with a dark level correction value; employing a control system to adjust the dark level correction value to drive the number of pixels having values lower than a predetermined value chosen to represent dark scene content to a predetermined range.

ADVANTAGES

The present invention has the advantage of providing dark level correction without the need for a separate dark current sensor. It also is capable of tracking dark level changes that may not be detectable by the use of a separate dark current sensor. An additional advantage of the invention is that it is also effective to reduce the effects of veiling glare on an image sensor, thereby improving the image quality. The method of the present invention does not use light shielded pixels (dark pixels) or any other external reference signal, and therefore avoids the problems associated with the unreliability of such reference signals.

DETAILED DESCRIPTION OF THE INVENTION

The present invention is based on the assumption that a small predetermined percentage of pixels in any scene have no light incident upon them (i.e. these pixels are dark). The pixel value associated with these pixels can then be assumed to be the dark level offset. The dark level correction value is adjusted in a feedback control loop to maintain the number of pixels that have a pixel value less than a predetermined value to a predetermined range.

The assumption that a predetermined percentage of pixels will have no light incident on them may be invalid for some scenes, for example for a properly exposed low contrast scene, where there will be fewer dark pixels than the predetermined percentage, the method will overcorrect the dark current correction value. Alternatively, for a scene containing a large black object there will be more dark pixels, the method will under-correct. These situations are addressed by imposing limits on the dark current correction value as will be described below.

Figure 1:
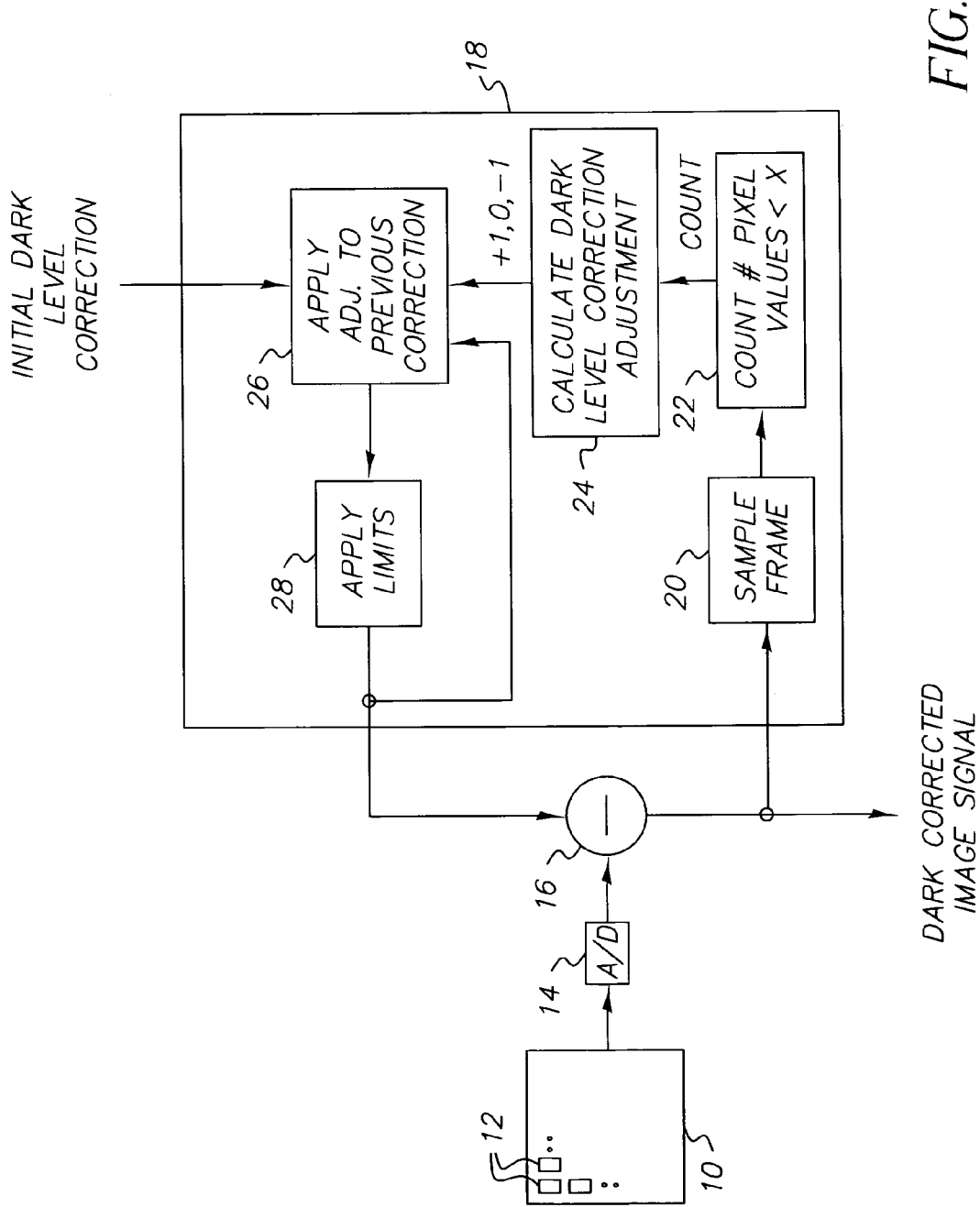
FIG. 1 is a block diagram showing a solid state image sensor and dark correction apparatus according to the present invention.

Referring to FIG. 1, an image sensor 10 (CCD or Active CMOS Imager) includes an array of photo-sites 12 that generate voltage signals that are proportional to the incident light on the photo-sites and that include a dark current component. The voltage signals are converted to digital values by analog to digital (A/D) converter 14 to produce a digital image signal. The digital signal from a photo-site is called a pixel, and the digital signal value is called a pixel value. Dark current contributes to the pixel values.

To improve the appearance of the image, the digital image signal is corrected for dark current by subtracting 16 a dark level correction value from each pixel value. The same dark level correction value is subtracted from every pixel. According to the present invention, a control system 18 is used to adjust the dark level correction value to drive the number of pixels having values lower than a predetermined value chosen to represent dark scene content to a predetermined range. The control system 18 samples 20 a dark corrected image frame from the dark level corrected image signal and counts 22 the number of pixel values in the sampled image frame that are less than a predetermined value X to produce a Count.

Next, a dark level correction value adjustment is calculated 24. The dark level correction value adjustment is calculated based on the count as follows. If the Count is less than a number representing a first predetermined percentage (e.g. 0.03%) of the pixels in the image, the dark level correction value adjustment is positive (e.g. +1). If the Count is greater than a second predetermined percentage (e.g. 1.0%), the dark level correction value adjustment is negative (e.g. −1). If the Count is between the first and second predetermined percentages, the dark level correction value adjustment is zero.

The dark level correction adjustment is then applied 26 to the previous dark level correction value to produce a new dark level correction value. An initial dark level correction value can be provided. The initial correction value can be determined for example from a factory calibration, or assumed from experience. An initial value of 10 for example has been found to work reasonably well for a 10 bit digital image signal. Alternatively, the control system 18 may simply be allowed to stabilize over time, without initialization, which will occur in a relatively short time at reasonable sampling rates (e.g. 3 times per second) since the dark level correction value can normally range between 5 and 40 for a 10 bit digital image signal.

To account for the cases noted above when the assumption about the percentage of dark pixels in an image fails, upper and lower limits are then applied 28 to the dark current correction value. The limits can be set around the factory calibration value for the dark level correction, typical values being 5 and 40 for the lower and upper limits respectively for a 10 bit digital image signal, with the factory calibration value being 10. Finally, the new dark level correction value is applied 16 to the succeeding digital image signal.

The method of the present invention can be implemented in a video camera as part of an auto exposure/auto-white balance control loop to periodically adjust the dark level correction value at the same rate that the exposure and white-balance is adjusted. Auto exposure is generally performed on a sample of the digital image frames. The sampled frames are further sub-sampled to reduce the data rate. For example, the auto exposure control loop may be operated at 3 times per second (every $10^{th}$ frame in a 30 frame per second video stream), and the frames further sub-sampled to one eighth of the original size of the frame.

In a preferred embodiment of the invention, the step 22 of determining the number of pixels having a value less than X is performed by forming a histogram of the pixel values in the sub-sampled frame, and summing the bins in the histogram from zero to the predetermined value X.

Figure 2:
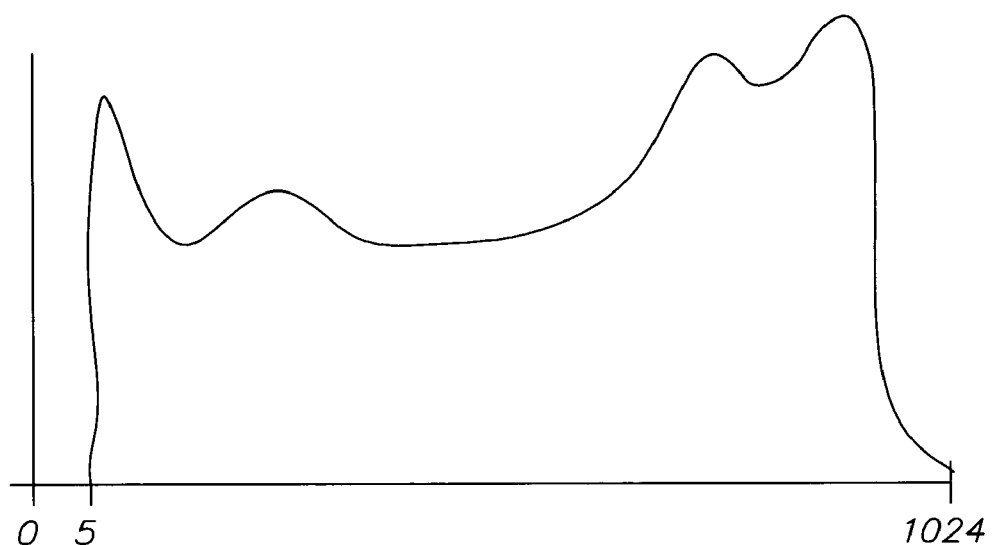
FIG. 2 is a histogram useful in describing the operation of the present invention, illustrating pixel values with the dark current correction level too low.
Figure 3:
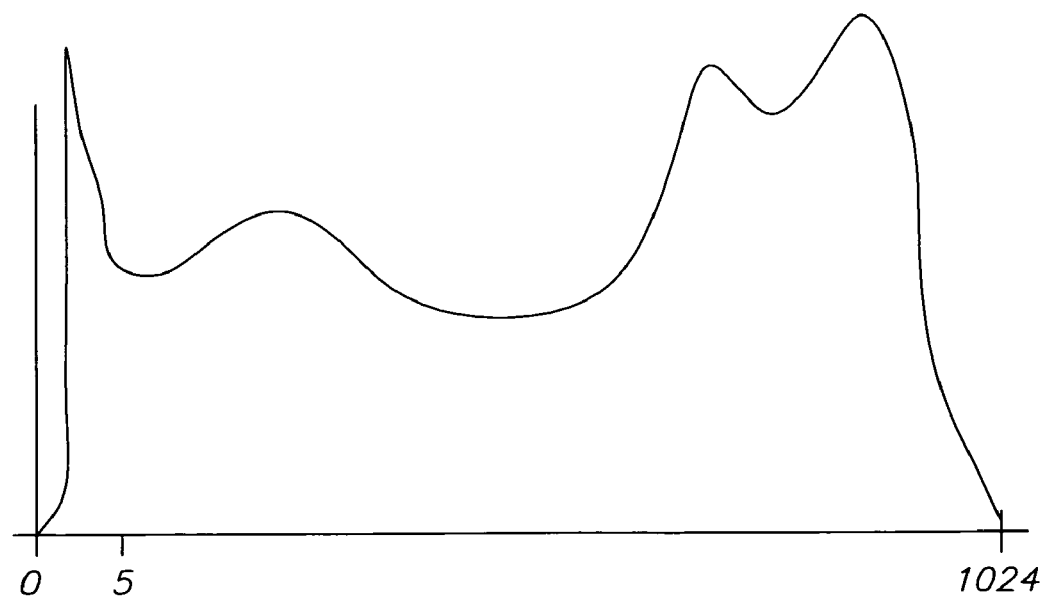
FIG. 3 is a histogram useful in describing the operation of the present invention, illustrating pixel values with the dark current correction level too high.
Figure 4:
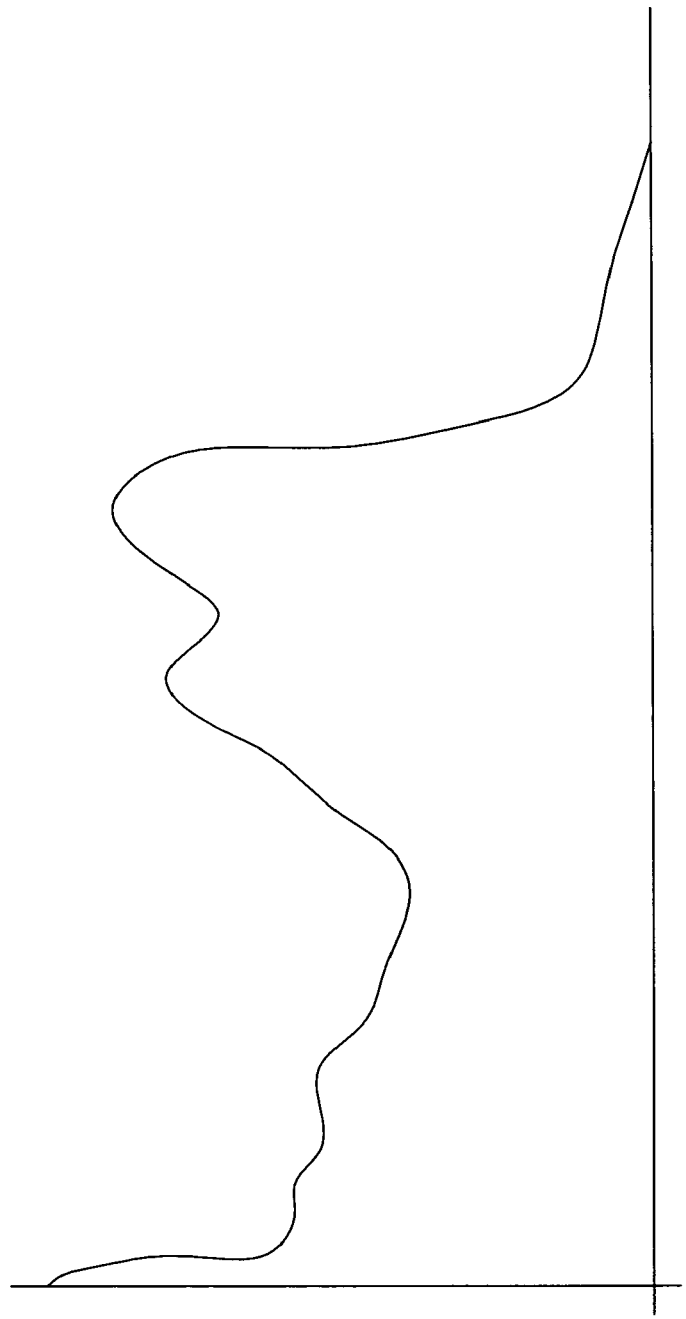
FIG. 4 is a histogram useful in describing the operation of the present invention, illustrating pixel values after dark current correction according to the present invention.

FIG. 2 shows the histogram of an image having an under-corrected dark level. The image contains no pixels with a value of less than 5. FIG. 3 shows the histogram of an image having a properly corrected dark level. It contains an expected percentage of pixels with a value of less than 5. FIG. 4 shows the histogram of an image having an over-corrected dark level. It contains a larger than desired percentage of pixels with a value less than 5.

The present invention can be implemented as software in a micro processor, as firmware in a programmed logic chip, or as hardware in a digital image processing circuit. Appendix A includes example C code for computing a simple histogram from a digital image, and appendix B includes example C code for computing the dark level correction value according to one embodiment of the present invention.

The invention has been described in detail with particular reference to certain preferred embodiments thereof, but it will be understood that variations and modifications can be effected within the spirit and scope of the invention.

PARTS LIST 10 image sensor
12 photo-sites
14 A/D converter
16 subtraction block
18 control system
20 sample step
22 count step
24 calculation step
26 apply adjustment step
28 apply limits step

APPENDIX A

C source code that computes a simple histogram:

```c
define MAX_DARK_PIXELS 765 int countDarkPixels ( )
{
      ulong  pixelCount = height*width;
      ushort     darkPixels = 0;

for (int i= 0;  i < pixelCount;  i +)
      {
            if ( *(imageStart+i) <= 5 )
            darkPixels++;

if(darkPixels >= MAX_DARK_PIXELS)
                  return darkPixels;
      }
      return darkPixels;
}
```

APPENDIX B

C source code that analyses and adjusts the dark offset

```c
define MIN_DARK_PIXELS 64 void AdjustDarkLevel (short darkPixels)
{
      uint                      regval;

if(darkPixels < MIN_DARK_PIXELS)
      {
            DarkOffset--;

if (m_ DarkOffset < (DarkOffsetCalib - 12))
                  DarkOffset = (DarkOffsetCalib - 12);

setDarkLevel (DarkOffset);
      }
      else if (darkPixels >= MAX_DARK_PIXELS)
      {
            DarkOffset ++;

if (DarkOffset > (DarkOffsetCalib + 2))
                  DarkOffset = DarkOffsetCalib + 2;

setDarkLevel (DarkOffset);
      }
}
```

What is claimed is:

1. A method of correcting for dark current in a solid state image sensor, comprising the steps of:
   a) capturing an image with the image sensor to produce a digital image having pixel values;
   b) correcting the pixel values with a dark level correction value; and
   c) employing a control system to adjust the dark level correction value to drive the number of pixels having values lower than a predetermined value chosen to represent dark scene content to a predetermined range; and wherein the sensor captures a stream of digital images, and wherein the control system performs the steps of:
      c1) sampling a digital image from the stream of dark current corrected digital images;
      c2) generating a count of the number of pixel values in the sampled digital image that are less than a predetermined value;
      c3) generating a dark level correction value adjustment based on the pixel value count; and
      c4) applying the adjustment to the dark level correction value.

2. The method claimed in claim 1, wherein the control system limits the adjustment to the dark current correction to a predetermined range around a factory calibration value, whereby the control system is prevented from overcorrecting.

3. The method claimed in claim 1, further comprising the step of sub-sampling the sampled digital image to produce a sub-sample of pixel values from the sampled image and employing the sub-sample, of pixel values to generate the count.

4. The method claimed in claim 3, wherein the step of generating a count includes the steps of generating a histogram of the pixel values in the sub-sample and summing bins in the histogram from zero to the predetermined value.

5. The method claimed in claim 4, wherein the step of generating a dark level correction value adjustment includes the step of limiting the adjustment such that the dark level correction value is limited to a predetermined range around a factory calibration value, whereby the control system is prevented from overcorrecting.

6. The method claimed in claim 1 wherein the dark level correction value adjustment increases the dark level correction value when the count is lower than a first predetermined value; decreases the dark level correction value when the count is higher than a second predetermined value; and does not change the dark level correction value when the count is between the first and second predetermined values.

7. A method of correcting for dark current in a solid state image sensor, comprising the steps of:
   a) capturing a first image having a variable dark level;
   b) converting the first captured image to digital pixel values;
   c) processing the digital pixel values to determine the number of pixels having values below a dark level threshold pixel value;
   d) providing a dark correction value based on said number of pixels; and
   e) using the dark correction value to modify the digital pixel values of a second captured image.

8. Apparatus for correcting dark current in a solid state image sensor that produces digital images having pixel values, comprising:
   a) a dark level corrector for correcting the pixel values produced by the image sensor with a dark level correction value to produce dark level corrected pixel values; and
   b) a control system responsive to dark level corrected pixel values to adjust the dark level correction value to drive the number of pixels having values lower than a predetermined value chosen to represent dark scene content to a predetermined range; and wherein the sensor captures a stream of digital images, and wherein the control system includes:
      b1) means for sampling a digital image from the stream of dark current corrected digital images;
      b2) means for generating a count of the number of pixel values in the sampled digital image that are less than a predetermined value;
      b3) means for generating a dark level correction value adjustment based on the pixel value count; and
      b4) means for applying the adjustment to the dark level correction value.

9. The apparatus claimed in claim 8, wherein the control system includes means for limiting the adjustment to the dark current correction to a predetermined range around a factory calibration value, whereby the control system is prevented from overcorrecting.

10. The apparatus claimed in claim 8, further comprising means for decimating the sampled digital image to produce a sub-sample of pixel values from the sampled image and wherein the means for generating a count employs the sub-sample of pixel values to generate the count.

11. The apparatus claimed in claim 10, wherein the means for generating a count includes means for generating a histogram of the pixel values in the subsample and summing bins in the histogram from zero to the predetermined value.

12. The apparatus claimed in claim 11, wherein the means for generating a dark level correction value adjustment includes means for limiting the adjustment such that the dark level correction value is limited to a predetermined range around a factory calibration value, whereby the control system is prevented from overcorrecting.

13. The apparatus claimed in claim 10 wherein the means for generating a dark level correction value adjustment increases the dark level correction value when the count is lower than a first predetermined value; decreases the dark level correction value when the count is higher than a second predetermined value; and does not change the dark level correction value when the count is between the first and second predetermined values.

* * * * *